J. F. GAIL.
MACHINE FOR MAKING WIRE STRUCTURES.
APPLICATION FILED OCT. 10, 1914.
1,152,889.
Patented Sept. 7, 1915.
10 SHEETS—SHEET 9.
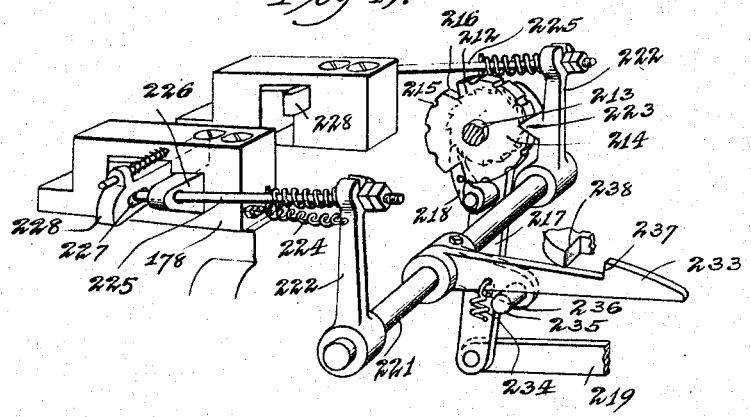
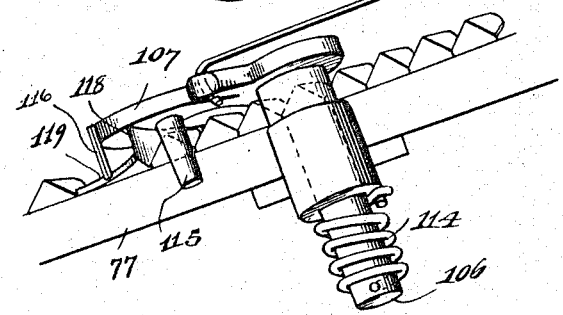
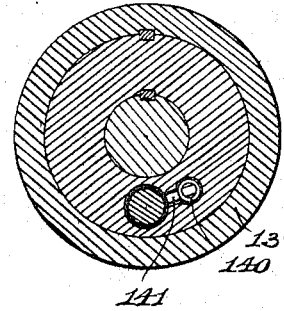
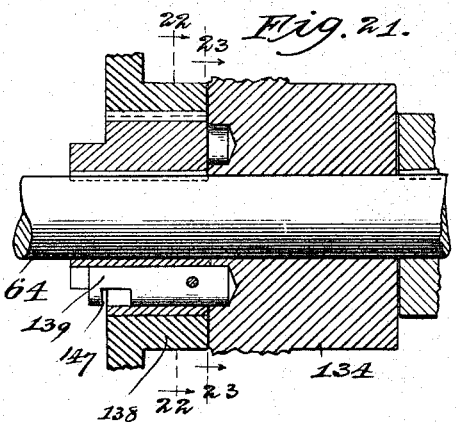
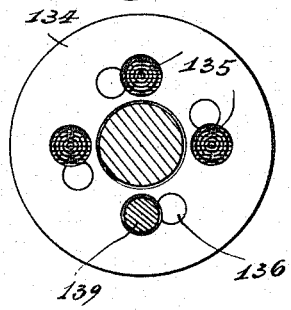

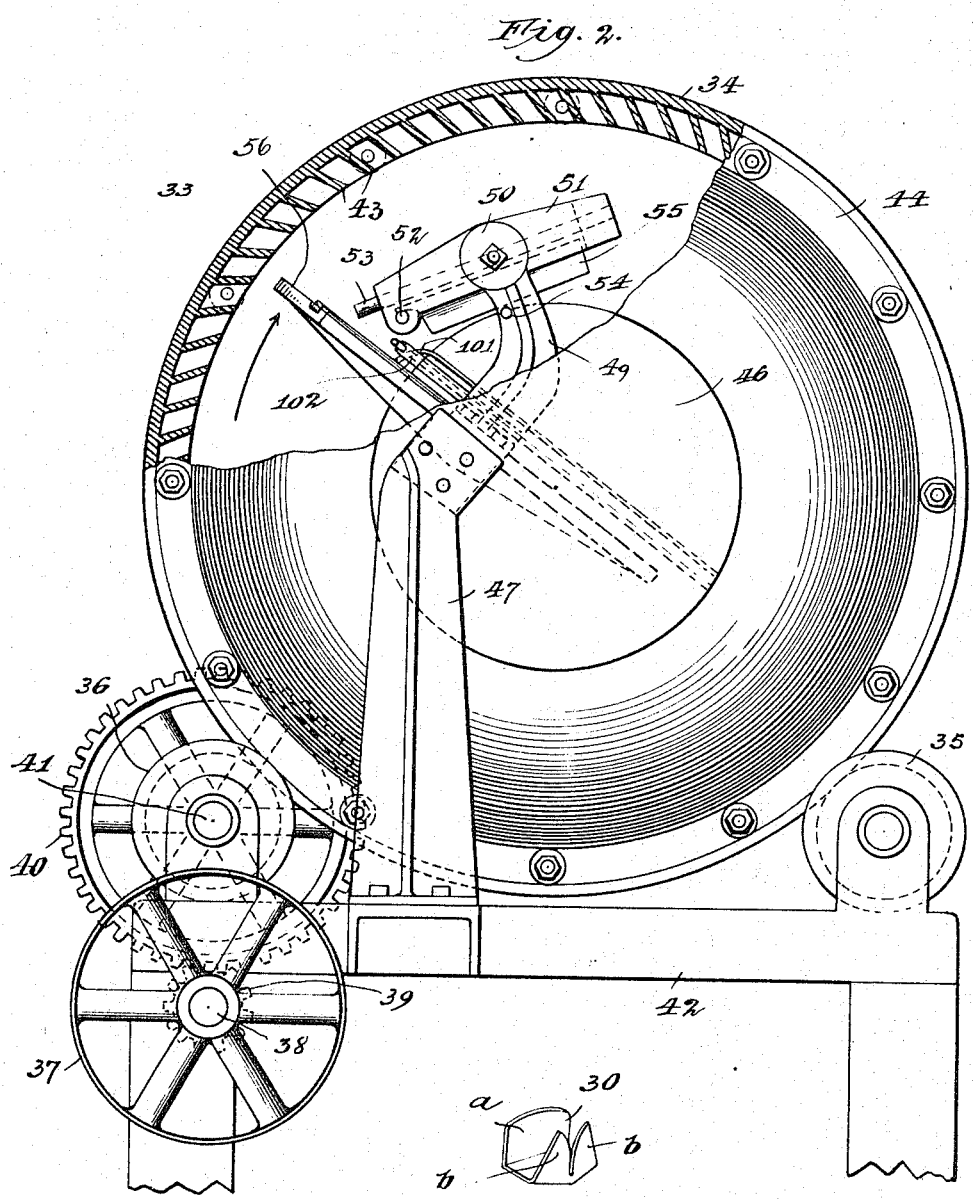

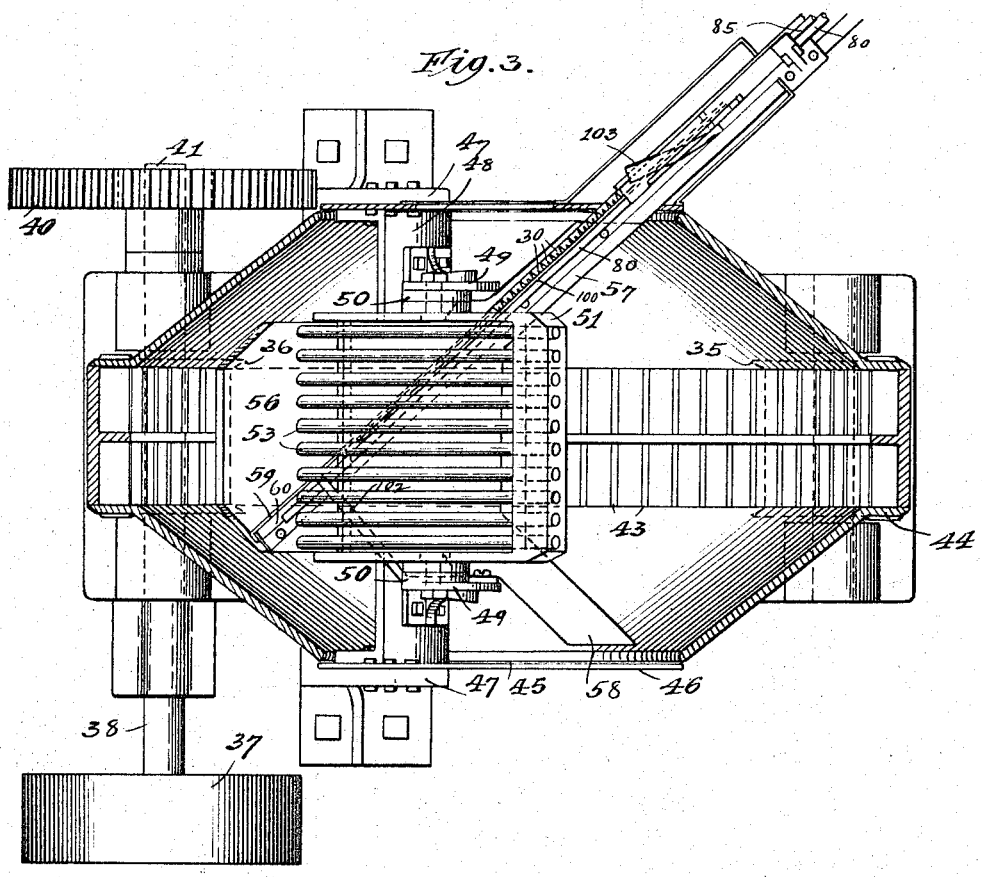

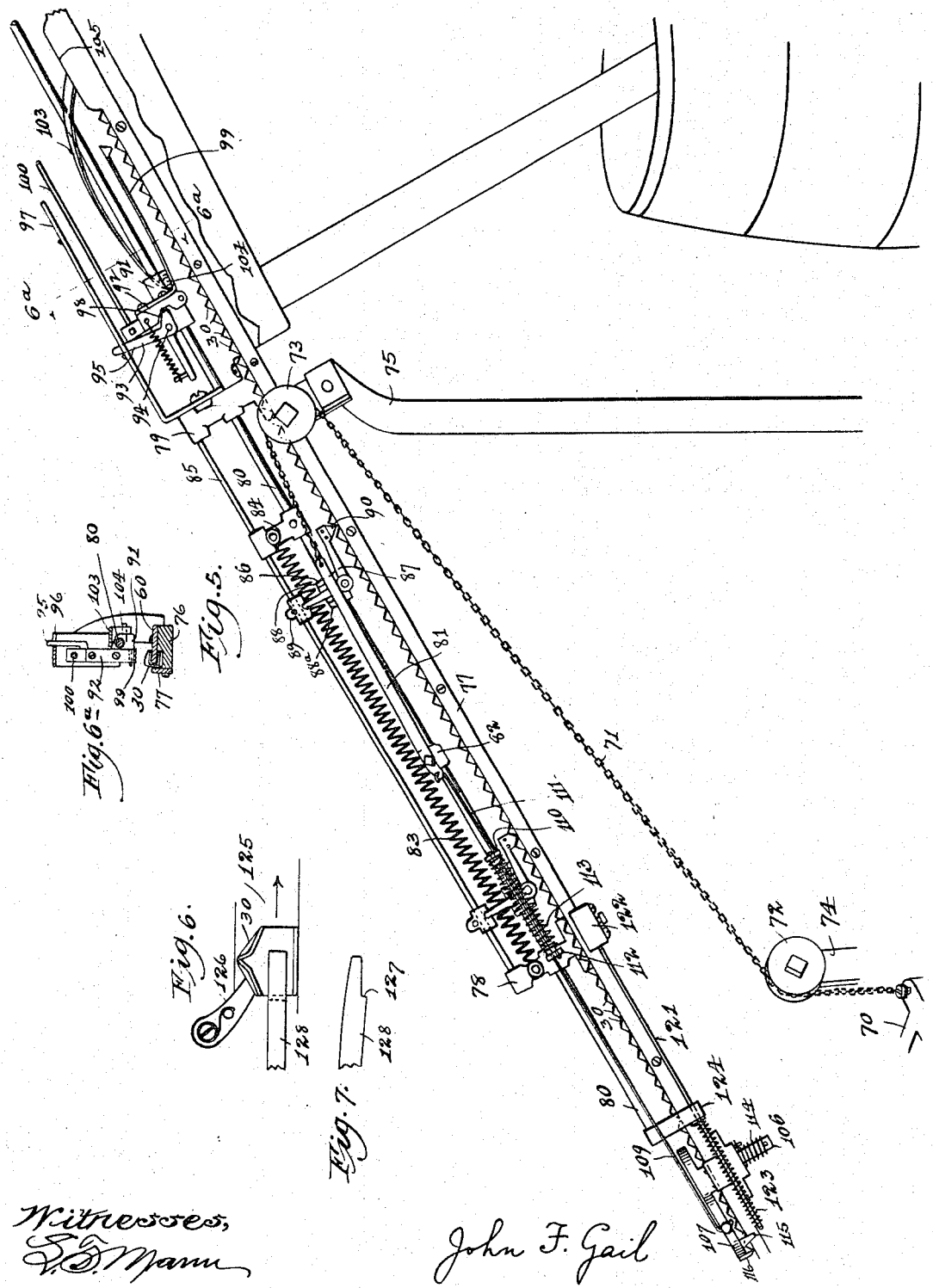
J. F. GAIL.
MACHINE FOR MAKING WIRE STRUCTURES.
APPLICATION FILED OCT. 10, 1914.
1,152,889. Patented Sept. 7, 1915.
10 SHEETS—SHEET 3.

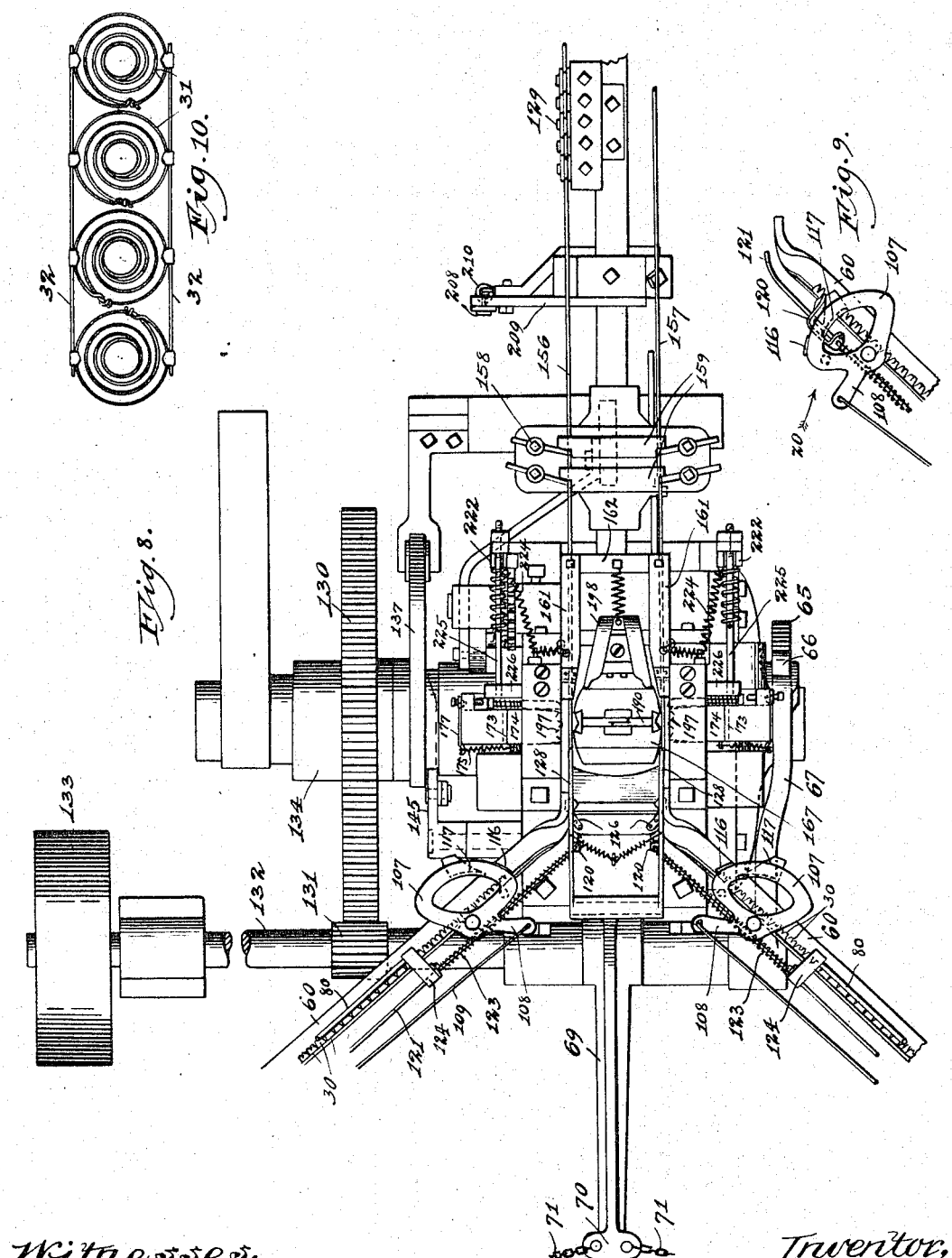

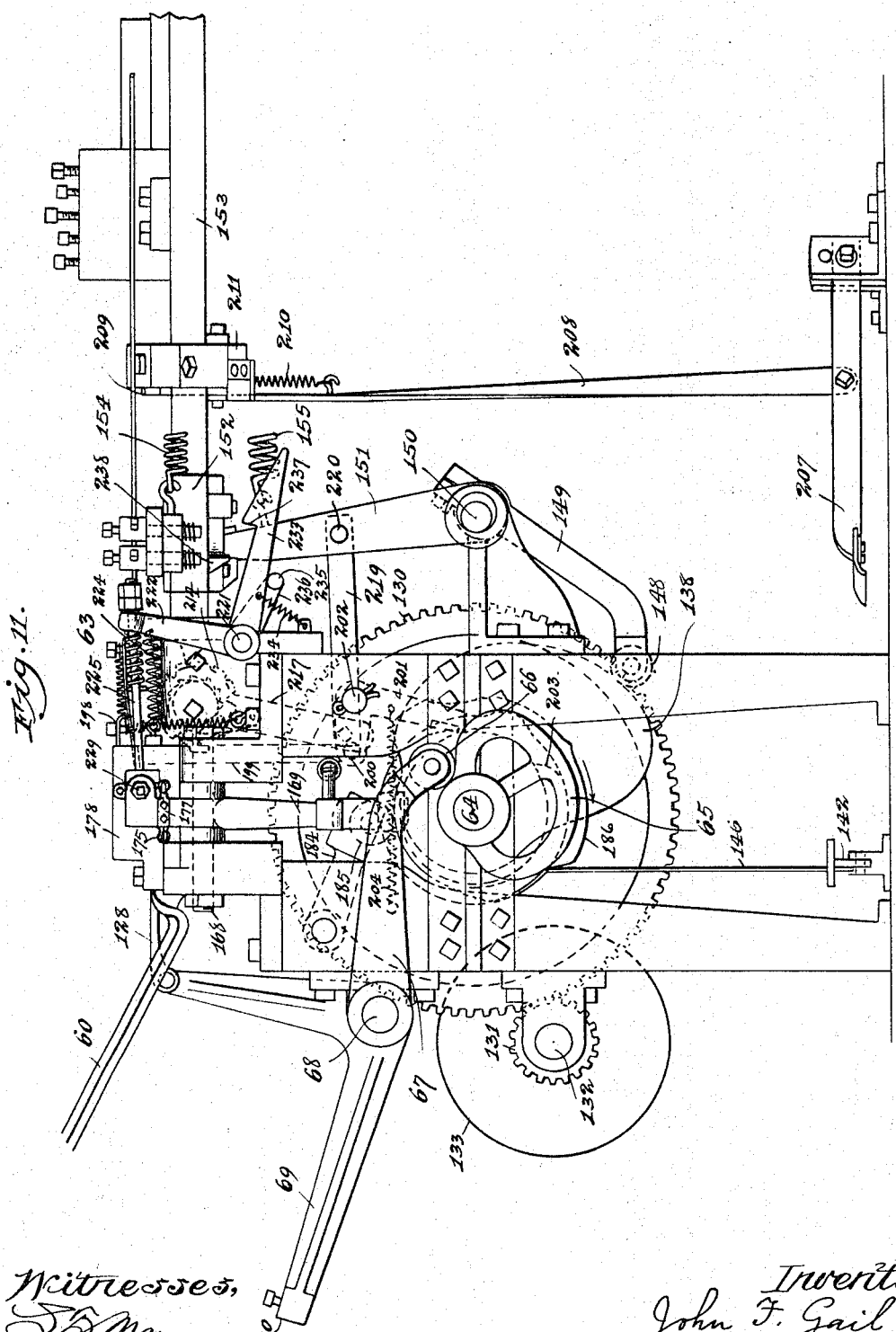

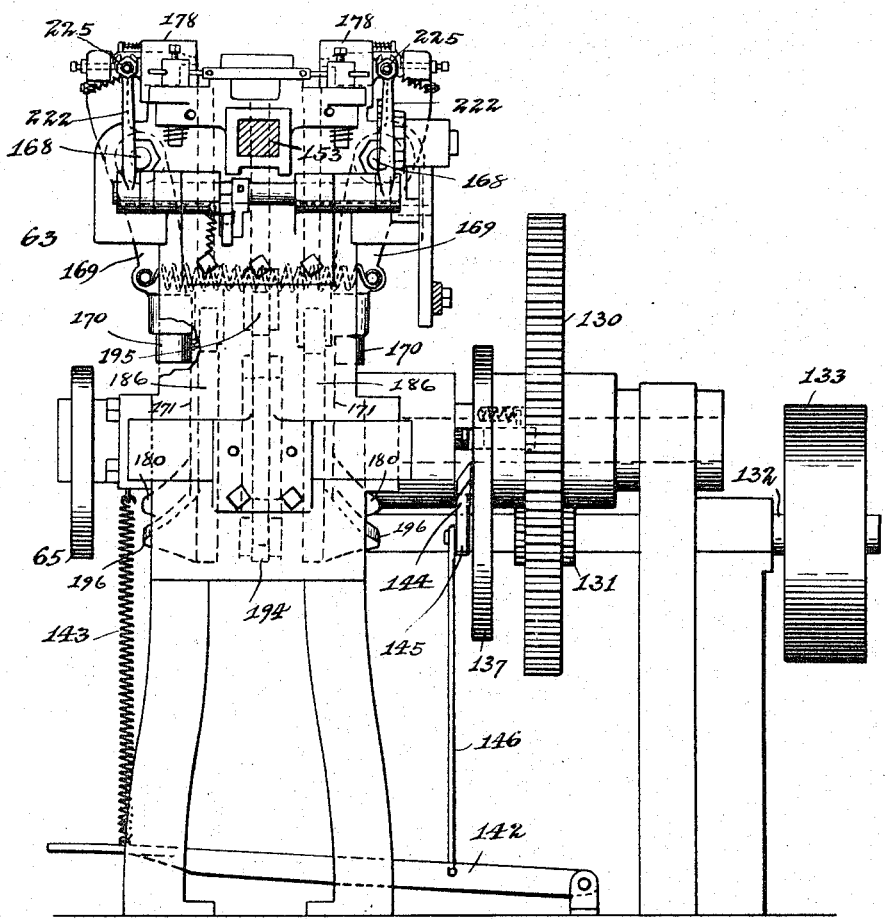

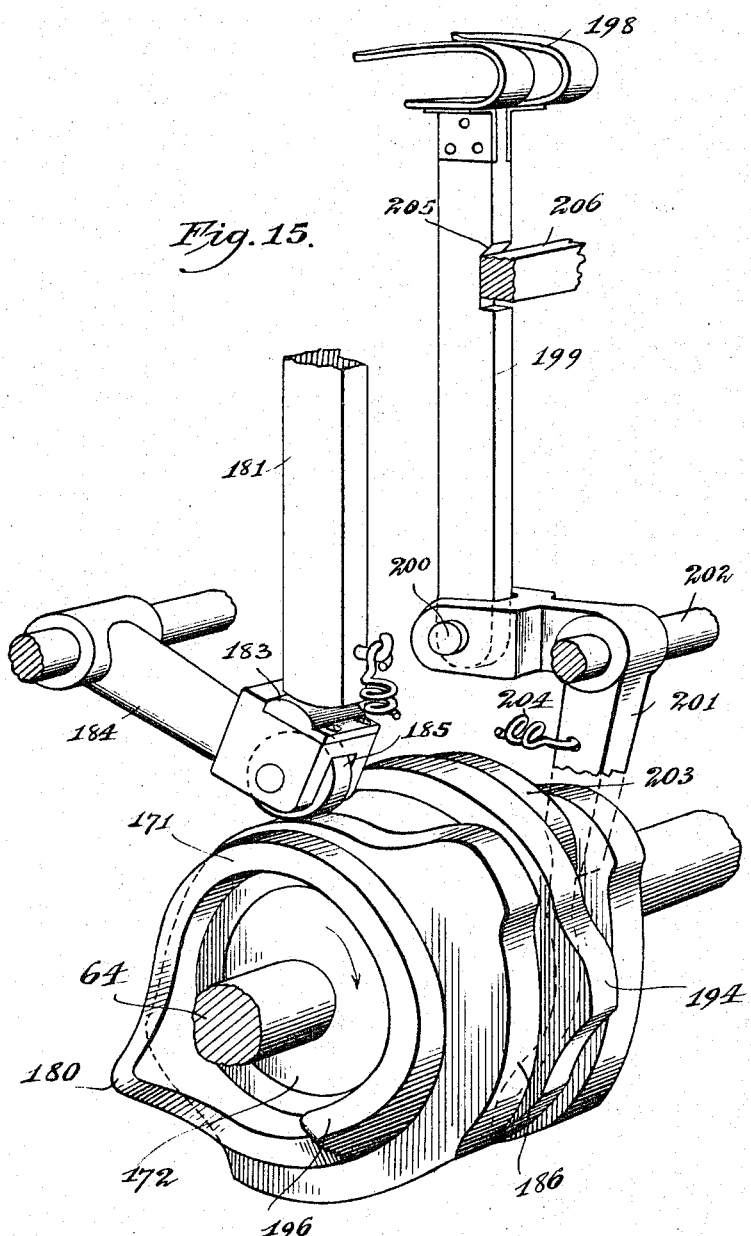

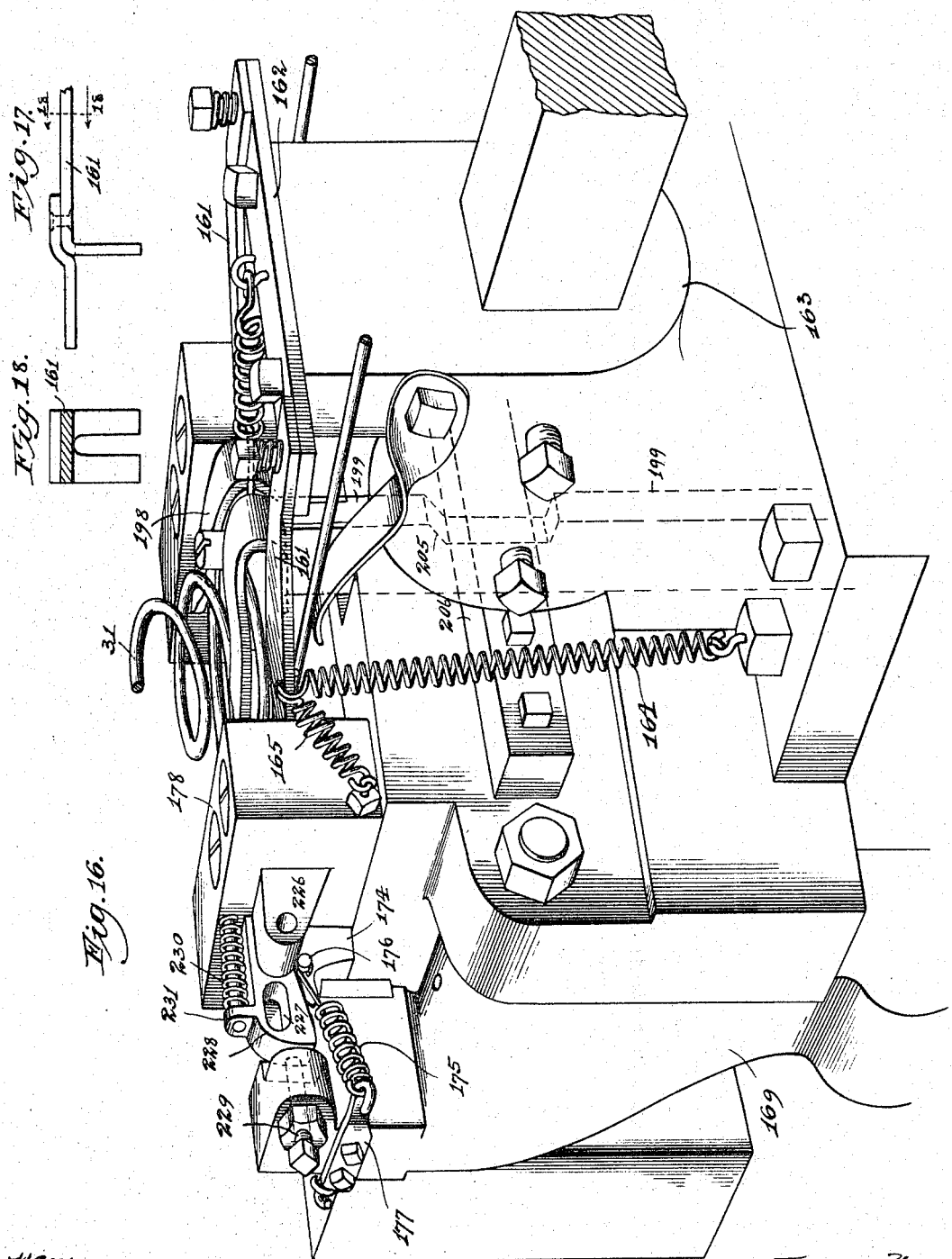

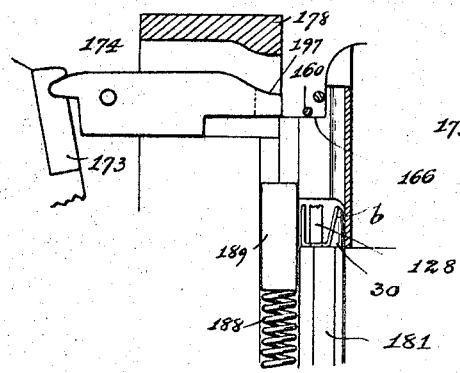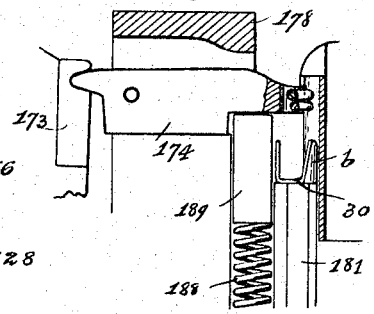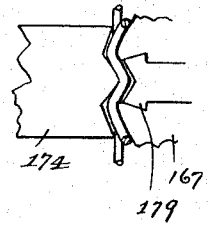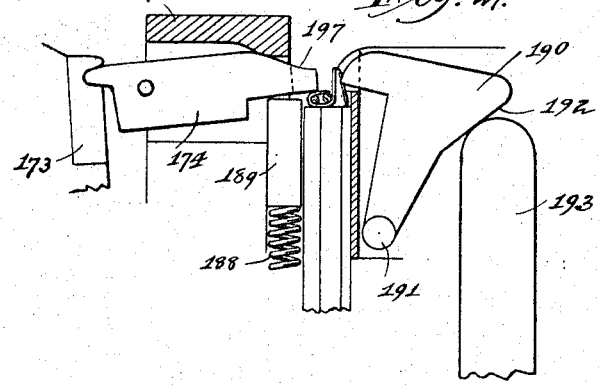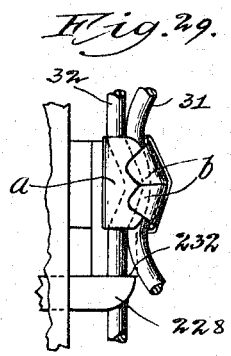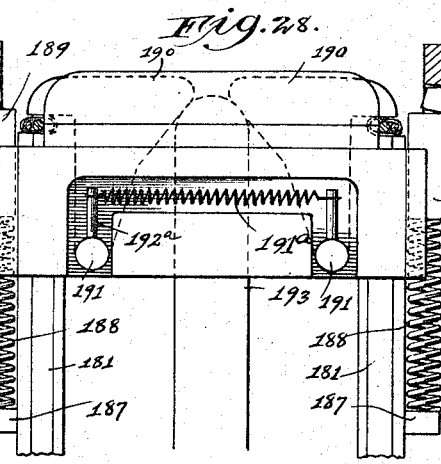

UNITED STATES PATENT OFFICE.

JOHN F. GAIL, OF KENOSHA, WISCONSIN, ASSIGNOR TO THE SIMMONS MANUFACTURING COMPANY, OF KENOSHA, WISCONSIN, A CORPORATION OF WISCONSIN.

MACHINE FOR MAKING WIRE STRUCTURES.

1,152,889.     Specification of Letters Patent.     Patented Sept. 7, 1915.

Application filed October 10, 1914. Serial No. 866,036.

*To all whom it may concern:*

Be it known that I, JOHN F. GAIL, a citizen of the United States, residing in the city of Kenosha, in the county of Kenosha and State of Wisconsin, have invented certain new and useful Improvements in Machines for Making Wire Structures, of which the following is a specification.

My invention relates to machines for making wire structures, and, although adaptable for various uses, it is particularly well fitted for applying clips to different members of a wire structure to be connected together, as, for instance, in building up spring seat structures. As an illustration, I have embodied my invention in a machine which contemplates the application of a suitable metal clip to the two wire members at the point where it is desired to tie said members together against relative movement, and, preferably, said clip is mutually interlocked with said wire members in order to prevent both relative movement of the clip with reference to said wire members and also relative movement of each of said wire members with respect to each other. In carrying out my invention in a rapid, efficient and economical manner, I preferably employ a machine which automatically supplies itself with the said metal clips, and also automatically applies the clips successively to the wire members which are to be connected together.

Hence, among the salient objects of my invention are, to provide improved means for feeding the clips one at a time successively from a suitable source of supply; to provide improved means for automatically selecting from a supply of said clips those which are perfect, while at the same time rejecting those clips which are imperfect and any foreign matter which happens to be present mixed in said supply of clips; to provide an improved mechanism for automatically and successively moving said clips forward step by step and presenting them to the clip-applying mechanism in the proper sequence and suitably timed relation with said clip-applying mechanism; to provide an improved machine for automatically applying said clips to the various wire members to be connected together; to provide an improved machine for applying said clips to the various parts to be connected together, and so organized that after a certain number of clips have been applied in proper sequence the machine will automatically perform other functions incident to the assembling of a complete wire structure, and, in general, to provide an improved machine of the class described.

As a preferred embodiment of my invention, I will describe its application to the construction of one of the spring assemblies forming part of an automobile spring seat frame, which description will be illustrated with reference to the accompanying drawings, wherein—

Figure 1 is a perspective view of said clip; Fig. 2 is an elevation, partly in section, of the clip magazine; Fig. 3 is a plan view, partly in section, of the said clip magazine; Fig. 4 is a fragmentary detail of the clip guide channel in the said magazine; Fig. 5 is an elevation of the mechanism employed for transferring the clips from the magazine to the clip-applying mechanism; Fig. 6 is a detail plan view of one of the clips and associated parts after presentation to the clip-applying machine; Fig. $6^a$ is a cross-section of Fig. 5 taken on the line $6^a$—$6^a$; Fig. 7 is a fragmentary elevation of one of the longitudinal clip-pushers; Fig. 8 is a plan view of the clip-applying machine, certain parts being not shown or broken away in order to limit the size of the drawing; Fig. 9 is a plan view of one of the clip-selectors; Fig. 10 is a plan view of one of the completed spring assemblies; Fig. 11 is a side elevation of the clip-applying machine, certain parts being not shown or broken away in order to lessen the size of the drawing; Fig. 12 is an end elevation of the clip-applying machine; Fig. 13 is a detail view of the duplicating clutch, showing it in vertical section; Fig. 14 is a longitudinal section of the clutch shown in Fig. 13; Fig. 15 is a perspective view showing the main cam member and certain associated parts; Fig. 16 is an enlarged perspective view of the head of the clip-applying machine; Fig. 17 is a side view of one of the wire-positioning fingers; Fig. 18 is a section of Fig. 17 taken on the line 18—18; Fig. 19 is a perspective view of the counting mechanism and associated parts; Fig. 20 is a perspective view of the under side of the clip-selector shown in Fig. 9 and looking in the direction of the arrow; Fig. 21 is a longitudinal section taken through the main clutch or trip mechanism; Fig. 22 is a sectional view of Fig. 21 taken on the line 22—22; Fig. 23 is also a sectional view of Fig. 21 taken on the line 23—23; Fig. 24 is a cross-section through the wire and clip-forming mechanism, the wire members to be connected being shown in section; Fig. 25 is a similar view to Fig. 24 after the wires have been formed; Fig. 26 is a plan view of a portion of Fig. 25; Fig. 27 shows the clip-applying mechanism while the clip is being applied; Fig. 28 shows both sides of the clip-applying mechanism in section, just after the final squeezing operation; and Fig. 29 is an enlarged detail view showing the completed joint.

Referring to the drawings, Figs. 1, 10 and 29 show a preferred embodiment of the clip, the method in which it is applied to two wire members to be connected together, and a complete assembly of springs connected together by means of the clips and using my improved machine. In these drawings 30 represents the clip as a whole, 31 are the spring units to be connected together, and 32 are the longitudinal wires used for tying together the four spring units. Upon an inspection of Fig. 29 it will be seen that the members 32 and 31 are each provided with a similarly V-shaped crimp, the two crimps being internested together side by side in interlocking relation. After the wires have thus been placed together, the clip 30 is formed over the two wires where they are crimped and this holds them securely together, both against mutual movement and movement relative to the clips, as is manifest from inspection of Fig. 29. It will be noticed that one of the arms $a$ of the U-shaped clip is flat and unitary, whereas the other arm of the U-shaped clip 30 is divided into two parts $b$, which parts bear substantially the same relation to each other as the angle of the crimp formed in the wire 31, thus securing effective interlocking engagement with the crimp when the arms of the clip are folded over. It will be noticed that the two parts $b$ are slightly spaced apart from one another so that when they are folded over they will not overlap each other, due to the angle between them. Preferably the clips 30 are blanked out and formed up into the proper shape by means of suitable presses and dies and are then fed to the clip-applying machine from a magazine which I have illustrated as a whole 33. This magazine includes a tumbling barrel 34, the central portion of which is cylindrical and the ends thereof are frusto-conical in shape. The barrel is mounted to rotate upon a pair of flanged rollers 35 and 36 which engage the cylindrical portion of the barrel, and one of these rollers 36 is positively driven at a suitable speed by a belt passing around the pulley 37, the latter being keyed to a shaft 38 driving a pinion 39 which meshes with a spur gear 40 keyed to the shaft 41 which carries the flanged roller 36. The magazine 34 and its driving mechanism, just described, are mounted upon a framework 42 which is elevated a considerable distance above the floor upon which the clip-applying machine stands, for a purpose which will hereinafter appear. On the inside of the cylindrical surface of the tumbling barrel are formed a series of inwardly projecting obliquely disposed plates 43 which extend inwardly approximately the same distance as the inner edges of the flanges 44, the flanges and the plates thus forming pockets around the periphery of the tumbling barrel. The clips, which have been previously blanked and formed, are inserted in the tumbling barrel through one of the side openings 45, the latter for this purpose being provided with removable covers 46. Mounted at each end of the tumbling barrel are a pair of upstanding brackets 47 which are connected together through the barrel by means of a cross member 48, and upon this cross member are also carried a pair of angular brackets 49, these brackets being suitably spaced apart inside the tumbling barrel so as not to interfere with its rotation. The upper ends of these arms 49 are provided with similar bosses 50 between which is adjustably mounted a U-shaped casting 51. The lower open ends of this U-shaped casting are connected by a tie-rod 52, and the upper end of said casting 51 is comparatively large in cross-sectional area so as to provide means for inserting the grate-rods 53. These grate-rods 53 are secured in the upper end of the U-shaped casting 51 and lie parallel with each other and a sufficient distance apart to prevent perfect clips from passing between them, while at the same time foreign matter or imperfect clips are permitted to fall through. The frame 51 is tilted at a sufficient angle to the horizontal to permit the clips to slide down the rods freely, and beneath the frame 51, supported by a rod 54 passing between the two brackets 49 and by the rod 52, is a removable pan 55 for catching the foreign matter screened out from the supply of clips by the grate-rods 53. Formed integrally with the cross-member 48 is an inclined table 56 which extends upwardly beneath the lower ends of the rods 53 a sufficient distance to catch the clips as they slide off the rods. This inclined table 56 is furnished with a pair of obliquely extending arms 57 and 58 for the purpose of delivering the clips to whichever side of the magazine the clip-applying machine is located.

Referring to Figs. 3 and 4, it will be seen that across the surface of the table 56 and along the top of the leg 57 is formed a groove of a sufficient width and depth to accommodate freely the parts *a* of the clips. Secured to one side of this groove and almost completely closing it is a metal slide-rail 60, the lower corner of its upper edge being beveled, as shown at 61, adjacent the oppositely formed bevel 62 at the upper side of the groove 59. The space between the two bevel faces 61 and 62 is such that while the parts *a* of the clips are permitted to enter the groove 59 and thus occupy the position shown in Fig. 4, the parts *b* of the clips, which, as before described, are angularly disposed to each other, cannot enter, and thus the clips, if they enter the groove at all, always enter it in the position shown in Fig. 4.

Referring to Figs. 3, 5, 8 and 11, it will be seen that the slide-rail 60 extends to the clip-applying machine, designated as a whole 63, in a substantially straight line almost its entire length and the clips arrange themselves adjacent to and in contact with each other upon said slide-rail. The clips, however, do not feed themselves down the slide-rail by gravity alone, and it is necessary to positively urge them down into the clip-applying machine by a mechanism which will now be described.

Referring to Figs. 8 and 11, 64 represents the main shaft of the clip-applying machine which, as described later, is arranged to make a single revolution every time a clip or a pair of clips is applied by the machine. This shaft 64, which projects from one side of the machine, carries a cam 65 which is engaged by a cam-roller 66 mounted on the end of an arm 67 keyed to the oscillatory shaft 68. This oscillatory shaft 68 carries and operates a bell crank lever 69, the outer end of which 70 thus makes an up-and-down movement every time the machine performs a clip-applying operation. The end 70 of this lever 69 is shown at the bottom of Fig. 5 and is connected to a chain 71 which passes over a pair of fixed idler pulleys 72 and 73, supported on the floor brackets 74 and 75. The slide-rail 60, between the clip magazine and the clip-applying machine, is secured to and supported by a longitudinal bar 76, and the clips are prevented from becoming dislodged from the slide-rail by a thin retaining plate 77 secured to the edge of said bar 76. Mounted upon the bar 76 are a pair of small brackets 78 and 79, these brackets being bored out to provide a slide for the reciprocatory rod 80. The rod 80 is reciprocated by the chain 71, the end of which is secured to a flat link 81 secured to a block 82 rigidly fastened to the rod 80. The rod 80 is returned to its lower position by means of a spring 83, the lower end of which is secured to the fixed bracket 78 and the upper end to a block 84, the lower end of the latter being rigidly connected to the rod 80 while the upper end slides upon a smaller fixed rod 85 secured in the castings 78 and 79. Also mounted upon the rod 80 are a pair of small castings 86 upon which are pivoted small bell crank levers 87. These small bell crank levers are adapted to oscillate to some extent upon the blocks 86, their movement being limited by laterally projecting lugs 88 and 88$^a$. One end of each of the bell cranks engages a small block 89 clamped frictionally upon the fixed rod 85. The other end of each of the bell crank levers 87 is furnished with a V-shaped wiper 90 adapted to engage the clips and urge them down the slide-rail to the clip machine in the following manner: When the rod 80 is pulled upwardly by the chain 71 the block 86 moves upward with it, and, since the upwardly projecting end of the bell crank is frictionally held in the block 89, the bell crank oscillates and lifts the wipers 90 out of contact with the clips. The oscillation of the bell crank lever, however, is arrested by a small lug 88$^a$ soon after the wiper 90 has been lifted out of contact with the clips, and the block 89 is then moved along the rod 85 by the outwardly projecting end of the bell crank lever. When, however, the rod 80 commences its downward movement the clamping block 89, during the initial movement of the rod 80 in a downwardly direction, is stationary, and consequently the bell crank lever 87 oscillates and brings the wiper 90 into contact with the clips which are thus urged downwardly toward the clip machine. It should be noticed that after the clips have been moved downwardly by the wipers a sufficient distance to feed them forward the length of one clip, the wiper slides off the top of the clips and along them during its further downward movement, and while the bell crank as a whole is moving downwardly into its lower position, the friction clamp 89 is also pushed downwardly by the outwardly projecting arm of the bell crank. There are two of these bell-crank wipers suitably located on the rod 80 between the brackets 78 and 79. There is also provided an additional mechanism above the bracket 79 in order to properly feed the clips along the slide-rail at the upper end thereof after they have entered the groove 59 in the apron 56. This comprises a small casting 91 secured to the upper part of the rod 80 and carrying a horizontally pivoted arm 92 which coöperates with a bell crank lever 93 mounted on a horizontal pivot 94 secured in the side of said casting 91. The bell crank 93 has a comparatively long arm 95 which projects outwardly and is adapted to engage the ends of a notch 96 of a flat plate 97 which lies parallel with the rod 80 and is secured to the fixed bracket 79. The short arm of the bell crank 93 is adapted to engage a notch in the adjacent side of the pivoted arm 92, this arm having a cam surface 98 which is so shaped that when the rod 80 is raised to its upward limit of movement, the arm 95, when it strikes the upper end of the notch in the plate 97, oscillates slightly and causes the arm 92 to swing slightly in a clock-wise direction, the bell crank lever and the arm 92 then remaining locked in this position until the bell crank strikes the lower notch 96, when the rod 80 is returned to its lower position. It is thus apparent that when the casting 92 is moving in an upward direction, the arm 92 is in the position shown, whereas, during its downward movement, it is held in its rocked position by its cam surface being engaged by the short arm of the bell crank. Secured to the upper side of the arm 92 is a spring wiper 99, somewhat similar in effect to the wipers 90, and having the same office; and to the outer end of the arm 92 is also secured a slender rod 100 which extends into the tumbling barrel and has a turned down end 101 (see Fig. 2) which enters the groove 59 in the apron 56. In order to prevent the comparatively slender rod 100 from being distorted or pushed aside by any clips which may fall and strike it as they are tumbled around in the barrel, the bent end 101 of the rod 100 is arranged to be adjacent to the upper extension of the rod 80 which extends into the tumbling barrel and slides in a small bracket 102 which is secured to one of the arms 49. It is readily understood that as the rod 80 reciprocates up and down, the slender rod or wire 100 also reciprocates with it, and, in addition, has a rocking movement which causes the end 101 to move down and engage the links on the plate when the rod 80 reaches its upper limit of movement, and to raise the end 101 when the rod 80 reaches its downward limit of movement. Practically this results in a clawing movement which drags downwardly any clips which accumulate on the plate 56 or on the slide-rail 60 as the tumbler barrel revolves. Occasionally it is found that defective clips lodge in the groove, and in some cases even perfect clips do not engage the slide-rail 60 in their proper position. In order to obviate this difficulty I provide a very thin, flat finger 103 which is pivoted to the side of the bracket 91 upon a horizontal pin 104. This finger 103 is very loosely mounted upon the pin 104 and during the greater part of its movement slides upon a raised track 105 which is an extension of the guard-plate 77 and does not engage the clips, but since the upper end of the track 105 does not extend so far as the upward limit of movement of the finger 103, the latter, toward the limit of its upward movement, is permitted to fall by gravity from the upper end of the track 105 and engages the clips on the slide-rail. As seen in Fig. 3, there is a gap between the lower end of the oblique arm 57 and the top of the guard-plate 77, and the upper end of the finger 103 is so shaped that any clips which it engages will be pushed off the slide-rail owing to the absence of the guard-plate.

Describing now the selector mechanism for separating the clips, one at a time, from the supply carried by the slide-rail 60, referring to Figs. 5, 8, 9 and 20, it will be seen that at the lower end of the inclined track there is mounted upon a transverse pivot 106 an oscillatory selector 107. This selector is operated by means of an integral bell crank 108 and a wire 109, the upper end of which is secured to a collar or washer 110, the latter also furnishing a sliding bearing for the wire 111 which latter is hooked into the lower end of the flat link 81. The lower end of the wire 111 is secured to a similar collar 112 which also furnishes a sliding bearing for the wire 109, and secured to and interposed between the two collars 110 and 112 is a spiral spring 113, which takes care of any excess of movement of the block 82. The selector 107 is returned to its normal position by means of a spring 114, its oscillatory movement being limited by the guard-plate 77 which is engaged by the stud 115 projecting from the under side of the selector. Referring to Figs. 9 and 20, it will be seen that the selector is somewhat sector-shaped in outline and at its outer end is provided with an edgewise mounted stop-plate 116 which is secured to the selector-plate and extends circumferentially with relation thereto. Also secured to the selector in a circumferential relation and having a radial distance from the pivot 106 less than the radial distance of the stop-plate 116 by an amount substantially equal to the width of one of the clips, is a separator-plate 117 which has a comparatively sharp edge 118, as shown in Fig. 20. The stop-plate 116 and the separator-plate 117 during the oscillatory movement of the selector 107, slide with their edges in contact or substantially in contact with the upper surface of the slide-rail 60 and thus prevent the downward movement of the clips, except when the selector oscillates sufficiently to remove the said plates out of the field of travel of the clips. Secured to the lower edge of the separator-plate 117 is a flat piece of metal 119 having a shape like that of a plow and performing substantially the same function. In other words, as the separator-plate 118 enters between the clips and separates the lower one from those above it, as the selector continues its oscillatory movement the plow 119 gradually pushes the lower clip down the slide-rail, so that when the selector makes its backward oscillatory movement the clip is found to be below the stop-plate 116. It is understood that when the selector-plate moves back into its inactive position, as shown in Fig. 8, the plow and the separator-plate 118 are moved away from the line of clips which are permitted to be pushed down the slide-rail and against the stop-plate 116 (now in position) by means of the wipers 90 which at that time are making their downward stroke.

Referring to Figs. 8 and 11, it will be seen that the lower end of the slide-rail 60 as it enters the machine is curved so as to bring the clips into position with the U-shaped arms extending upwardly, and in order to push each of the clips down this curved portion of the slide-rail into the machine after the clip has been separated or selected by the selector mechanism just described, I employ a pushing slipper, which is a piece of flat metal formed up into the shape shown at 120 in Fig. 9. The member 120 has upper and lower lugs which are apertured to slide upon the curved rod 121, the latter lying parallel to the slide-rail 60 and being similarly curved. The upper end of the rod 121 is secured in a block 122 fastened to the under side of the bar 76, and the lower end is fixed in the frame of the clip-feeding machine. The slipper 120 is reciprocated by a spring 123, the lower end of which is attached to the slipper and the upper end to a block 124 which slides upon the rod 121 and is secured to the lower end of the reciprocatory rod 80. The operation of the slipper 120 is obvious. While the rod 80 is making its upward stroke the slipper is pulled up along the rod 121 by means of the spring 123 until the lower end of the slipper slides over the top of the clip which has been last separated by the selector mechanism, the further upward movement of the slipper 120 being then arrested owing to its striking the outer end of the selector 107, further movement of the rod 80 being taken care of by the stretch of the spring 123. As the rod 80 commences its downward movement, the spring 123 is compressed and pushes the slipper 120 down along the rod 121, and the clip which is now below the slipper is pushed down the slide-rail 60 until it is finally pushed off the end of the latter and assumes the position shown in Fig. 6 in a horizontally extending slot 125 formed in the head of the clip-applying machine. Just before the slipper 120 has its movement arrested by its striking the head of the clip-applying machine, the clip is pushed into the field of the spring-pressed retaining dog 126, the end of which engages one of the oblique ears of the clip. When in this position the clip has been advanced far enough so that its rear edge is slightly ahead of the offset 127 formed in the end of the delivery finger 128, which is pivoted upon the vertical arm of the bell-crank 69 and consequently reciprocates back and forth in a substantially horizontal direction every time the clip machine operates. The length of the stroke of the finger 128 is so arranged that the clip is delivered into the proper position (as shown in Fig. 24) to be operated upon by the clip-applying mechanisms which will now be described.

The clip-applying machine which I have illustrated as one of the preferred embodiments of my invention also performs another function incident to the manufacture of the complete wire structure, as shown in Fig. 10. As will be apparent from an inspection of the drawings, the machine is symmetrically arranged to apply a pair of clips simultaneously to the springs 31 so as to connect each side of the latter to the connecting wires 32. The connecting wires 32 are fed forward from a continuous supply of wire which is automatically cut off by the machine in the proper lengths after a definite number (in this case four) of the springs have been united to the said wires. These wires can be seen entering the machine in Fig. 8, a portion of one of the wire straighteners for one of the wires being indicated at 129.

As before described, 64 is the main shaft of the machine which is connected through a clutch mechanism to the large spur-gear 130 which normally revolves idly on said shaft and is driven by a pinion 131, the latter being keyed to a shaft 132 which is driven by a belt passing around the pulley 133. This clutch mechanism is shown in Figs. 21, 22 and 23. In these drawings 134 is the hub of a continuously rotating spur-wheel 130. This hub 134 is in its face furnished with a plurality of (in this case four) circular apertures 135, the driving edges of which are shod with hardened steel pins 136. Securely keyed to the shaft 64 and adjacent to the spur-wheel 130 is the wire-feeding cam 137 which has a hub 138 provided with a longitudinal cylindrical bore in which slides a clutch pin 139 adapted to enter the circular apertures 135 in the face of the hub 134. This clutch pin 139 is forced toward the face of the hub 134 by means of a spring 140 which is seated in a cylindrical bore parallel with the axis of the clutch pin and engages a transverse pin 141 fixed in the side of the clutch pin 139. The clutch is controlled by a foot pedal lever 142, shown in Figs. 11 and 12, and which is normally raised by a tension spring 143 so as to normally hold the shaft 64 quiescent. This is effected by a plow-shaped stop cam 144 on the end of a horizontally pivoted lever 145 which is connected to the lever 142 by a link 146, the cam 144 thus being normally in position to have its point engaged between the end of a notch 147 at the rear end of the clutch pin 139 and the rear face of the hub 138, thus effecting the withdrawal of the clutch pin 139 and the consequent disengagement of the shaft 64 from the constantly running spur-wheel 134. Obviously, if the foot pedal 142 be depressed, the cam 144 is moved out of engagement with the notch 147 and the clutch pin 139 is then permitted to be forced axially so that when one of the apertures 135 comes opposite as the spur-wheel 134 rotates, the clutch pin will enter said aperture and lock the shaft to the spur-wheel. It must be understood that unless the operator wishes to apply the clips continuously and successively, without intermission, he ordinarily removes his foot from the lever 142 as soon as the shaft 64 has commenced to rotate, so that as soon as the latter has made a revolution the cam 144 withdraws the clutch pin 139 and arrests the movement of the shaft after it has made the one revolution and consequently performed one clip-applying cycle of movements.

Describing the wire-feeding means,—the cam 138 previously referred to is engaged by a cam-roller 148 on the end of an arm 149 (see Fig. 11), the latter being mounted upon a cross-shaft 150 to which is secured an upwardly projecting arm 151, the upper end of which engages the wire-feeding slipper 152 which is adapted to slide upon a square rod 153 fixed in and projecting from the rear end of the frame of the machine and toward the wire supply and straightening devices. The slipper 152 is retracted into its rear position by a spring 154 which is secured to a fixed point (not shown) at the rear of the straightening devices. In order to hold the cam-roller 148 always in engagement with the cam 138, the arm 151 is retracted by a spring 155 having its rear end attached in a similar manner to that of the spring 154. The upper end of the arm 151 is free to move rearwardly under the influence of the spring 155 quite independent of the position of the slipper 152 and free from interference with it. The top of the slipper 152 extends out on each side of the supply wires 156 and 157 and engages the latter by means of obliquely arranged spring-pressed wire dogs 158 of conventional form and construction, which grip the wire against the members 159. It should be understood that there is a second set of these wire-gripping dogs associated with the wire-straightening mechanism in such a manner that the wire is prevented from slipping back to the supply reels when the slipper 152 is retracted in order to gain a fresh grip of the wire prior to its forward feeding stroke. The wire as fed forward occupies the position with reference to the clip shown at 160 in Fig. 24 and is held in that position by a spring-operated finger 161 shown in Figs. 8 and 16, which is pivoted to a flat cross-plate 162 secured on the top of the boss 163. This finger 161 has a depending fork-shaped end, as shown in Figs. 17 and 18, which is large enough to comfortably receive the wire. This finger is pulled down by a spring 164 and pulled outwardly by a second spring 165 so as to properly position the wire in the position shown in Fig. 24, while at the same time bearing down strongly on the wire to prevent its rising from the seat 166. The position of the coil spring 31 which is to be connected to the wire 32, is shown in Fig. 16, and it should be noted that the bottom coil of the spring is large enough to fit comfortably around the upstanding frame 167, the bottom coil of the spring being supported by a ledge on the said former, not shown, and occupying the position indicated in Fig. 24. The wire and the spring are then in position to be operated upon by the crimping mechanism, which will now be described.

Referring to Figs. 12, 15 and 11, it will be seen that on each side of the machine is mounted on a horizontal pivot 168 at right angles to the axis of the shaft 64, a lever 169 the lower end of which carries a cam-roller 170. This cam-roller is engaged by a longitudinally extending annular cam surface 171 of a cam 172 mounted on a shaft 64, and thus, as the shaft 64 rotates, the upper end of the said lever 169 moves inwardly and outwardly toward the former block 167. Referring to Figs. 16 and 28, it will be seen that the inner face of the upper end of the lever 169 is shod with a hardened steel block 173, the upper end of which is suitably hollowed out to receive the rounded end of the outer forming jaw 174, the latter being kept tightly into engagement therewith by means of a pair of springs 175, the inner ends of which are secured to a transverse pin 176 extending through said jaw and the outer ends of which are hooked over a small cross-piece 177 bolted to the outer face of the top of the lever 169. The outer forming jaw 174 reciprocates in a slot formed in a rigid block 178 secured to the head of the machine, which slot has a vertical height sufficient to provide for a comparatively large amount of vertical movement of the said jaw, this being clearly indicated in Fig. 24. As indicated in Fig. 26, the side of the former block 167 adjacent the wires and the outer jaw is shod with a steel insert 179 which has a V-shaped outer face which receives the crimped part of the wires when the crimp is formed by the inward movement of the jaw 174, the latter being suitably shaped at its inner end, as shown in Fig. 26, to give a crimp of the desired angle. This crimping of the wires is effected when the cam-roller 170 is engaged by the cam point 180 on the annular cam 171; and after this desired crimping has been effected, the continued rotation of the cam 171 causes the outer jaw 174 to recede to its outer position. It should be understood that when the crimping is being effected, as shown in Fig. 25, the outer longitudinal wire 160 is temporarily pushed inwardly together with the spring finger 161 which, however, pulls back the longitudinal wire into its position, as shown in Fig. 24, after the outer jaw 174 recedes. Before the crimping movement of the outer jaw 174 has been completed, the clip 30 has been pushed forward by the finger 128 which then withdraws, leaving the clip in the position shown in Fig. 24, on the top of the plunger 181. This plunger 181 is normally held downwardly in that position by means of a spring 182 secured to a suitable point at the base of the machine and, as indicated in Fig. 15, the bottom of this plunger 181 is rounded slightly and rests upon a rounded wear-plate 183 carried by the end of a pivoted arm 184. Directly beneath the wear-plate 183 there is also mounted in the arm 184 a cam-roller 185 which is engaged by a circumferentially extending cam surface 186 which is also a part of the rotary cam 172. This cam surface is so shaped that before the crimping operation is completed, the plunger 181 has commenced to rise and carry a clip 30 upward, and the latter finally reaches the position shown in Fig. 27.

Referring to Fig. 28, it will be noticed that some distance down the plunger 181 there is fixed therein an outwardly extending transverse pin 187 upon which rests a spring 188 carrying the subsidiary outer plunger 189, this plunger thus being carried upwardly by the upward movement of the plunger 181 and consequently raising the outer jaw 174 into contact with the top of its slot. Shortly after the crimping operation has been effected and the clip has been brought up into its proper position by the plunger 181, an initial bending inward of the split ears $b$ is effected by a preliminary movement of the inner folding jaw 190. The latter is a somewhat T-shaped piece of hardened steel inserted in the head of the former 167 and pivoted therein at its lower end, as shown at 191 (see Figs. 27 and 28). The inner side surface of the folding jaw 190 is beveled, as shown at 192, in order to form a cam surface for the central plunger 193, the upper end of the latter being suitably rounded to engage said cam surface 192. The two inner folding jaws 190 are retracted into their inner positions by the tension spring 191$^a$ which is attached to a pair of vertical pins 192$^a$ carried by the pivots of said jaws 190 (see Fig. 28). This plunger 193 is reciprocated vertically by a cam 194 secured to the shaft 64 and which coöperates with a cam-roller 195 carried by the lower end of said plunger (see Fig. 12). This preliminary folding of the split ears of the clip is followed by a folding movement of the outer jaw 174, which operation is illustrated in Fig. 27. It should be noticed that during this folding movement of the outer jaw, which is effected when the cam-roller 170 strikes the cam surface 196, the outer jaw is resiliently pushed upward by the spring-supported plunger 189 and as the outer jaw moves inwardly, its upper surface 197, which is suitably curved for that purpose, engages the correspondingly curved upper side of the slot in which said outer jaw slides. Thus, while the jaw 174 is moving inwardly, it at the same time moves downwardly and thus pushes the ear $a$ of the clip firmly down into contact with the wires. During these two initial squeezing operations the plunger 181 is lifted slightly by its cam and it afterward recedes slightly to its original raised position. After the jaw 174 has receded, the ears $b$ of the clip are then folded over flat upon the ear $a$ by the further movement of the inner folding jaw 190, this position being shown in Fig. 28; and while the said jaw 190 is in this position, the plunger 181 is raised slightly in order to give the clip a final squeezing or flattening. While the crimping and clip-applying has been going on, the lower coil of the spring 31 has been held securely in place by a resilient forked clamp 198 carried by the upper end of a vertical bar 199, the latter being pivotally connected on a pin 200 carried by the arm of a bell crank lever 201 pivoted on a shaft 202. The lower depending arm of this bell-crank lever is suitably shaped to coöperate with a cam 203 secured to the shaft 64. When the cam 203 in its rotation operates the bell crank 201 against the tension of the spring 204, the rod 199 is thus depressed and pulls down the fingers of the fork 198 into contact with each side of the lower coil of the spring, and while this downward movement is being effected there is also a transverse forward movement of the fork toward the coil, which is effected by a small cam surface 205 on the back of the bar 199 engaging a fixed cross-bar 206 (see Fig. 15). After the clip has been given its final squeezing movement the folding members 174 and 190 all return to their normal inactive positions prior to the next clip-applying operation, and the fork 198 is raised out of contact with the bottom coil of the spring 31 by the continued rotation of the cam 203. At the same time that the fork 198 rises, the continued rotation of the cams 186 causes a further upward movement of the plungers 181 which thus force the spiral spring 31 and its connected wire 32 off the former and permit the spring to be moved forward by the next feeding movement of the two wires 32 when the wire-feeding slipper 152 makes its advance movement toward the center of the machine. It should be noted that this advance movement of the wire is slightly greater than the diameter of the bottom coil of the spring 31 so as to obviate interference between the several springs of the unit when the complete assembly is finished. If it is desired to form rows of springs in which the spacing of the individual springs 31 along the wires 32 is different, this may conveniently be done by means of the foot lever 207 which is connected by a link 208 to a finger 209. The finger 209 is normally lifted out of range of the slipper 152 by means of a spring 210, the upper end of which is connected to the block 211 and the lower end to the link 208. When the foot lever 207 is depressed the finger 209 is brought down into the range of the slipper 152 in its backward movement, and thus the slipper stops short of the block 211 by an amount equal to the thickness of the finger 209.

In order to effect the cutting off of the wires 32 when a sufficient number of springs 31 have been clamped thereto by the clips, I employ a counting mechanism, shown in Fig. 19. This includes an index or pattern wheel 212 which is rotatably mounted upon a pivot 213, which latter also carries a ratchet wheel 214. The index wheel 212 has on its periphery a series of notches 215, the number of notches being some multiple of the number of springs which it is desired to apply to the wires 32 before the latter are severed by the cut-off mechanism. In this case I have shown a wheel having twelve notches; that is to say, three times as many notches as there are springs to be applied to the wires 32. Of these twelve notches, three are relatively deep, as shown at 216, each deep notch 216 corresponding with the particular time that it is desired to effect the cutting off of the wires 32. Loosely mounted upon the shaft 213 is a depending lever 217 which carries a spring pawl 218 adapted to engage the teeth of a ratchet wheel 214, the latter having teeth corresponding in number to the number of teeth in the pattern wheel 212. The lever 217 is oscillated back and forth by a link 219 pivotally connected between the lower end of said lever 217 and a pivot 220 secured intermediate the length of the lever 151. The position of this pivot 220 is such that the oscillation of the lever 151 advances the ratchet wheel one notch each time the shaft 64 makes a single revolution, and thus the index wheel 214 makes a corresponding movement of one notch during each clip-applying operation of the machine. Mounted upon a cross-shaft 221 at the rear of the machine are keyed a pair of upstanding arms 222, one of which carries a tooth 223 which is adapted to engage the notches in the index wheel 212. A spring 224 connected between one of said arms 222 and the block 178 tends to pull the said arms 222 toward the clip-applying head, and this tends to push longitudinally the rods 225. Each of said rods 225 slides in a lug 226 projecting from the outside of the block 178, and when the tooth 223 is located in one of the shallow notches 215 of the index wheel, the end of the side rod 225 does not enter the pocket in the side of the cut-off die 228. This cut-off die 228 is pushed inwardly by an adjustable screw 229 mounted in the upper end of the lever 169, and is retracted outwardly by a compression spring 230 interposed between the block 178 and a small lug 231 on the back of said cut-off die 228. When, however, the rods 225 are permitted to be dragged longitudinally by the spring 224 when the tooth 223 enters one of the deep notches in the index wheel, their ends enter the pockets 227 in the sides of the said cut-off slides 228 and, consequently, after an inward movement of the upper end of the lever 169 the springs 230 are ineffective to return said cut-off slides into their normal back position in contact with the screws 229 and said cut-off slides remain in the position shown in Figs. 19 and 29. The position of the edge of the cut-off slides 228 is now such that when the plunger 181 makes its final upward movement in the act of ejecting the connected coil, the edge 232 of the said plunger cuts off the wire against the lower edge of the said cutting slide 228. It will be noticed from an inspection of Figs. 10 and 29 that the wires 32 are cut off comparatively close to the clips at both ends of the completed spring assembly, and it is therefore necessary to shorten the length of feed of the wire after the final spring 31 has been clipped to the assembly. This is taken care of by a lever 233 which is loosely mounted upon the shaft 221 and is pulled down by a spring 234 so that ordinarily it rests upon a transverse pin 235 carried by the end of a small arm 236 keyed to said shaft 221. When the tooth 223 is in engagement with one of the shallow notches 215 in the index wheel, the position of the pin 235 is such that the latch 237 is out of range of a projection 238 on the side of the feed-slipper 152, this being clearly shown in Fig. 11. When, however, the tooth 223 enters a deep notch in the index wheel the arm 236 raises the lever 233 into such position that the latch 237 is engaged by the said projection 238 and prevents a complete backward movement of the slipper 152, the actual distance it is permitted to recede by the said latch being equal to the sum of the lengths of wire at each end of the completed spring assemblies. After the tooth 223 is lifted out of the top notch, the latch 237 is released by the movement of the feeding-arm 151, when the latter again moves the slipper 152 in its forward direction.

The machine as described is arranged to apply clips to both sides of the bottom coils of the springs 31. If, however, occasion arises to use only one side of the machine, one of the clip-feeding devices may be disconnected either by unhooking the chain 71, or in any other convenient manner, so as to prevent the feeding of clips to the machine, and half of the clip-applying mechanism may be also disconnected by means of a clutch, illustrated in Figs. 13 and 14. This clutch is somewhat similar to that described in connection with the foot-lever trip device and includes a somewhat similar pin 239 which is located in a slide in the hub of the middle cam 194, the pin normally entering a cylindrical aperture 240 in the face of one of the end cams 172 which is loose and not keyed to the shaft. Withdrawal of the pin 239 from the aperture 240 is effected by means of an adjustable slide 241 slidable around the hub of the middle cam 194 on a pin 242 and having a plow-shaped end 243 similar to that of the tripping cam previously described. When it is desired to throw one side of the machine out of gear, the operator reaches down between the cams and moves the cam member 241 by means of the pin 244 in a circumferential direction toward the pin 239 so as to force the latter axially in a longitudinal direction out of the aperture 240.

It will be apparent to those skilled in the art that my invention is capable of considerable modification without sacrificing any of its advantages or benefits, and consequently I do not limit myself to the details of construction shown, except as specified in appended claims.

I claim—

1. Means for disposing a plurality of similar articles in like position, comprising, in combination, a member adapted to form a track for said articles, and means for agitating said articles and causing them promiscuously to impinge upon and engage said track, said track having guiding means adapted to reject said articles when the latter are presented to said track in improper position.

2. Means for disposing a plurality of similar articles in like position, comprising, in combination, a longitudinal track member, means for agitating said articles and causing them to impinge upon and engage said track, said track having guiding means adapted to reject said articles when the latter are presented to said track in improper position, and means for propelling said articles along said track after engagement therewith.

3. Means for disposing a plurality of similar articles in like position, comprising, in combination, a longitudinal track member, means for agitating said articles and causing them to impinge upon and engage said track, said track having guiding means adapted to reject said articles when the latter are presented to said track in improper position, and a reciprocatory member adapted to engage said articles and move them along said track after engagement therewith.

4. Means for disposing a plurality of similar articles in like position, comprising, in combination, a longitudinal track member, means for agitating said articles and causing them to impinge upon and engage said track, said track having guiding means adapted to reject said articles when the latter are presented to said track in improper position, a reciprocatory claw member adapted to engage said articles and move them along said track after engagement therewith while moving in one direction, and means for moving said claw member out of engagement with the clips on said track when said claw member is moving in the other direction.

5. Means for disposing a plurality of similar articles in like position, comprising, in combination, a longitudinal track rail adapted to form a slide for said articles, means for elevating the supply of articles and permitting said articles to impinge upon and engage said track rail, guiding means coöperating with said track rail to reject said articles where the latter are improperly presented to said track rail, and means for positively urging said articles along the track rail after their engagement therewith.

6. Means for disposing a plurality of similar articles in like position, comprising, in combination, a rotary container adapted to agitate and elevate said articles and cause them to fall by gravity within said container, a track rail disposed obliquely in said container and adapted to be engaged by said articles, and an inclined plate disposed adjacent to said track rail for guiding said articles into engagement with said track and having a groove between said track rail and said plate adapted to receive said articles when properly presented to said groove, and reject said articles when improperly presented.

7. Means for disposing a plurality of similar articles in like position, comprising, in combination, a rotary container adapted to agitate and elevate said articles and cause them to fall by gravity within said container, a track rail obliquely disposed in said container and adapted to be engaged by said articles, and means for urging said articles positively along said track rail.

8. Means for disposing a plurality of similar articles in like position, comprising, in combination, a rotary container adapted to agitate and elevate said articles and cause them to fall by gravity within said container, a track rail obliquely disposed in said container and adapted to be engaged by said articles, an inclined plate disposed adjacent to said track rail for guiding said articles into engagement with said track rail and having a groove between said track rail and said plate adapted to receive said articles when properly presented to said groove and reject said articles when improperly presented, and a reciprocatory claw member adapted to enter said groove and propel said articles along said track rail.

9. Means for disposing a plurality of similar articles in like position, comprising, in combination, a rotary container adapted to agitate and elevate said articles and cause them to fall by gravity within said container, a track rail obliquely disposed in said container and adapted to be engaged by said articles, an inclined plate disposed adjacent to said track rail for guiding said articles into engagement with said track rail and having a groove between said track rail and said plate adapted to receive said articles when properly presented to said groove and reject said articles when improperly presented, a reciprocatory claw member adapted to enter said groove and propel said articles along said track rail when moving in one direction, and means for lifting said claw member out of said groove when said claw member is moving in the other direction.

10. An assembling machine for wire structures, including, in combination, mechanism for first crimping a pair of members to be tied together, mechanism for afterward feeding a clip to be folded over said pair of crimped wire members, and means for finally folding said clip to embrace said members.

11. An assembling machine for wire structures, including, in combination, means for positioning a pair of wire members, means for crimping said wires operating simultaneously on both of said wires, means for internesting said crimped wires, and means for applying a clip to said wires when the latter are in said internesting relation.

12. An assembling machine for wire structures, including, in combination, means for positioning a pair of wire members in superposed relation, a reciprocating crimping jaw operating transversely across said wires while in said superposed relation, resilient means for positioning said crimped wires in adjacent internesting relation, and means for applying a clip to said wires.

13. An assembling machine for wire structures, including, in combination, a stationary die, a crimping jaw adapted to reciprocate toward said die, means for locating a pair of wires intermediate said jaw and die to permit said crimping jaw to operate upon both members simultaneously, means for changing the location of one of said wires to permit said wires to be assembled in internesting engagement, and clip-applying mechanism for clamping said wires together in said internesting engagement.

14. An assembling machine for wire structures, including, in combination, a relatively stationary anvil having a V-shaped die seat therein, a crimping jaw adapted to reciprocate toward said stationary die to crimp a pair of wires simultaneously, a resilient wire-guard adapted to normally hold one of said wire members in offset position relative to the other wire member, and a reciprocatory plunger operating transversely to the direction of reciprocation of said crimping jaw and adapted to deliver a clip into position to include both of said wire members in internesting engagement.

15. An assembling machine for wire structures, including, in combination, a relatively stationary anvil having a V-shaped die seat therein, a crimping jaw adapted to reciprocate toward said stationary die to crimp a pair of wires simultaneously, a resilient wire-guard adapted to normally hold one of said wire members in offset position relative to the other wire member, a reciprocatory plunger operating transversely to the direction of reciprocation of said crimping jaw and adapted to deliver a clip into position to include both of said wire members in internesting engagement, and folding mechanism for clamping said clip to said wire members.

16. In an assembling machine for wire structures, the combination of a relatively stationary die, a crimping jaw adapted to reciprocate toward said die and indent a pair of wire members to be connected together, a reciprocatory plunger adapted to deliver a clip into position to include said indented wires, and means for elevating said reciprocatory jaw to effect a folding of said clip.

17. In an assembling machine for wire structures, the combination of means for positioning a pair of wire members which are to be connected together, a reciprocatory jaw adapted to indent said wires simultaneously, means for placing one of said wires in offset position relative to the other wire, a plunger operating in a direction transverse to the direction of reciprocation of said crimping jaw and adapted to deliver a U-shaped clip into position to include said wires in internesting engagement with each other, and means for elevating said crimping jaw into position to operate upon and fold one of the arms of said clip.

18. In an assembling machine for wire structures, the combination of means for positioning a pair of wire members which are to be connected together, a reciprocatory jaw adapted to indent said wires simultaneously, means for placing one of said wires in offset position relative to the other wire, a plunger operating in a direction transverse to the direction of reciprocation of said crimping jaw and adapted to deliver a U-shaped clip into position to include said wires in internesting engagement with each other, and means for folding the arms of said clip into overlapping engagement to embrace said wire members in interlocking engagement.

19. In an assembling machine for wire structures, the combination of means for crimping a pair of wires to be connected together, means for positioning said wires in internesting engagement, means for feeding a U-shaped clip to said wires to include them between its arms in internesting engagement, and folding mechanism for bending the arms of said clip around said wires into overlapping engagement with each other.

20. In an assembling machine for wire structures, the combination of clip-folding mechanism, a reciprocatory plunger adapted to convey a clip into position to be operated upon by said folding mechanism, and synchronized means for successively propelling clips one at a time into the field of said plunger.

21. In an assembling machine for wire structures, the combination of a folding jaw adapted to bend a clip around a pair of wire members to be connected together, a reciprocatory plunger adapted to convey a U-shaped clip into position around said wires to be operated upon by said folding jaw and adapted to coöperate with said folding jaw to effect a final squeezing operation on said clip.

22. In an assembling machine for wire structures, the combination of a jaw adapted to reciprocate and indent a pair of wires to be connected together, means for elevating said jaw to effect a folding of a U-shaped clip to be applied to said wires, a second jaw adapted to effect a final folding operation on said clip, and a reciprocatory plunger adapted to convey a clip into position to include said wires in internesting engagement prior to the operation of said folding jaws.

23. In an assembling machine for wire structures, the combination of a jaw adapted to reciprocate and indent a pair of wires to be connected together, means for elevating said jaw to effect a folding of a U-shaped clip to be applied to said wires, a second jaw adapted to effect a final folding operation on said clip and a reciprocatory plunger adapted to convey a clip into position to include said wires in internesting engagement prior to the operation of said folding jaws, and adapted to effect a final squeezing operation on said clip in coöperation with one of said folding jaws.

24. In a machine for assembling wire structures, the combination of mechanism for applying clips to a pair of wire members to be connected together, and automatic wire-feeding mechanism for advancing a continuous length of wire into the field of said clip-applying mechanism to be connected to the second wire member, and means for cutting off a predetermined length of said wire.

25. In a machine for connecting together a plurality of wire units, the combination of mechanism for feeding forward a length of wire, and mechanism for applying clips to said wire units and said length of wire to connect them together.

26. In a machine for assembling wire units, the combination of mechanism for progressively feeding forward a length of wire to which the units are to be connected, mechanism for applying clips to said units and said wire to tie them together, and means for automatically severing said length of wire from a continuous supply after a predetermined number of said units have been applied to said wire.

27. In a machine for assembling together a plurality of wire units, the combination of means for feeding forward a continuous length of wire to which said units are to be attached a predetermined amount whenever a unit is to be applied to said wire, mechanism for applying clips to said wire and units to tie them together, means for severing said wire after a predetermined number of units have been assembled, and means for changing the amount of feed of said wire operating in conjunction with said severing means.

JOHN F. GAIL.

Witnesses:
J. H. CANTWELL,
JOHN BURNS.